United States Patent [19]

McGuire

[11] Patent Number: 5,889,600
[45] Date of Patent: Mar. 30, 1999

[54] CROSS-CONNECT FOR AN OPTICAL NETWORK

[75] Inventor: Alan McGuire, Woodbridge, Great Britain

[73] Assignee: British Telecommunications public limited company, London, England

[21] Appl. No.: 640,734

[22] PCT Filed: Oct. 24, 1994

[86] PCT No.: PCT/GB94/02330

§ 371 Date: May 6, 1996

§ 102(e) Date: May 6, 1996

[87] PCT Pub. No.: WO95/13687

PCT Pub. Date: May 18, 1995

[30] Foreign Application Priority Data

Nov. 8, 1993 [EP] European Pat. Off. .............. 93308884
Mar. 29, 1994 [GB] United Kingdom .................... 9406208

[51] Int. Cl.⁶ .................................................... H04J 14/02
[52] U.S. Cl. ............................................. 359/128; 359/121
[58] Field of Search .......................... 359/117, 120–121, 359/125, 127–128, 133, 139; 385/16–17

[56] References Cited

U.S. PATENT DOCUMENTS

| | | | |
|---|---|---|---|
| 4,417,334 | 11/1983 | Gunderson et al. | 359/120 |
| 4,834,483 | 5/1989 | Arthurs et al. | 359/121 |
| 4,864,650 | 9/1989 | Thinschmidt et al. | 359/121 |
| 4,873,681 | 10/1989 | Arthurs et al. | 359/121 |
| 5,093,743 | 3/1992 | Eng et al. | 359/120 |
| 5,241,409 | 8/1993 | Hill et al. | 359/128 |
| 5,361,254 | 11/1994 | Storck | 370/70 |
| 5,485,297 | 1/1996 | Sotom | 359/121 |
| 5,506,711 | 4/1996 | Takeyari | 359/117 |

FOREIGN PATENT DOCUMENTS

| | | |
|---|---|---|
| 0 382 431 | 8/1990 | European Pat. Off. . |
| 0 429 046 | 5/1991 | European Pat. Off. . |
| 0 461 519 | 12/1991 | European Pat. Off. . |
| 0 494 831 | 7/1992 | European Pat. Off. . |
| 2 043 240 A | 10/1980 | United Kingdom . |

OTHER PUBLICATIONS

Proceedings of the SPIE, 1992 Topical Meeting on Photonic Switching, 1–3 Jul. 1992, vol. 1807 pp. 462–469, White, H.H., 'Novel Photonic Switching Network Using Optical Frequency Division Shared–Medium et al'.

Transaction of the Institute of Electronics and Communication Engineers of Japan, Section E, vol. E75–B, No. 4, Apr. 1992, Tokyo JP pp. 267–273, Rokugawa et al, 'Wavelength Conversion Laser Diodes Application to Wavelength–Division Photonic Cross–Connect Node with Multistage Configuration'.

Conference Record, IEEE Global Telecommunications Conference, 6–9 Dec. 1992, vol. 3 pp 1902–1905, Orlando US, J. Sharony et al, 'Extension of Classical Rearrangeable and Non–Blocking Networks to the Wavelength Dimension'.

Proceedings of the Fourth Tirrenia International Workshop on Digital Communications, 19–23 Sep. 1989, pp. 238–248, D.W. Smith 'Combined Spectral & Spatial Multiplexing Schemes for Switching Networks'.

Electronics Letters, vol. 28, No. 13, 18 Jun. 1992, Stevenage, Great Britain, pp. 1268 –1270, H. Obara et al 'Star Coupled Based WDM Switch Employing Tunable Devices with reduced Tunability Range'.

Primary Examiner—Kinfe-Michael Negash
Attorney, Agent, or Firm—Nixon & Vanderhye, P.C.

[57] ABSTRACT

An optical cross-connect comprises a plurality of input modules ($10_1 \ldots 10_n$, $12_1 \ldots 12_n$) each for receiving a respective group of input signals ($11_1 \ldots 11_n$, $13_1 \ldots 13_n$) and deriving in response to each signal of the group an individual optical signal of a respective given wavelength, a plurality of output modules ($15_1 \ldots 15_n$, $16_1 \ldots 16_n$) each including a plurality of receptors (23, 24; 27, 28) selectively responsive to respective ones of the wavelengths of said optical signals, to provide an output signal, and a plurality of couplers ($14_1 \ldots 14_k$) each for coupling a respective one of said optical signals, each of a different wavelength, from each of the input modules, to a respective receptor of each of the output modules.

28 Claims, 7 Drawing Sheets

CROSS-CONNECT FOR AN OPTICAL NETWORK

FIELD OF THE INVENTION

This invention relates to a cross-connect for an optical network.

BACKGROUND OF THE INVENTION

In order to cope with the increasing demand for subscriber services on telecommunication networks, digital optical transmission networks are being introduced in which local access networks, which typically route electrical signals, are interconnected by a fibre optic network. This has been facilitated by the introduction of the Synchronous Digital Hierarchy (SDH) standard that deals with the formatting of signals in Synchronous Transfer Modules (STM) which will allow a unified telecommunication infrastructure and provides improved flexibility by permitting electrical digital signals from the local access networks to be converted into optical signals and transmitted through the optical network.

In order to upgrade the capacity of the optical network, Wavelength-Division-Multiplexing (WDM) techniques have been proposed, which permit the transmission capacity of a fibre link to be upgraded to the multi-Gbit/s range.

Thus, it has been proposed to provide a multi-Gbit/s WDM network superimposed on the top level of a SDH network. For a fuller discussion, reference is directed to I. Hawker, "Evolution of Digital Optical Transmission Networks", BT Technol. J., Vol. 9, No. 4, October 1991, pp 43–5. It is proposed to include nodes in the WDM network to allow dynamic re-routing of WDM data streams. It is proposed that each node should include access ports to allow optical streams to be dropped to and added from lower levels of the network. It has been proposed that routing of the high bit rate streams is directly performed in the optical layer whereas processing of any of the streams is achieved in the electronic domain by dropping it to a lower layer of the network. Network management and administration is proposed to be achieved from a management unit which configures an optical cross-connect at each node according to traffic requirements. Thus, optical cross-connects (OXC's) constitute the routing nodes of the WDM transport network.

Figure 1:
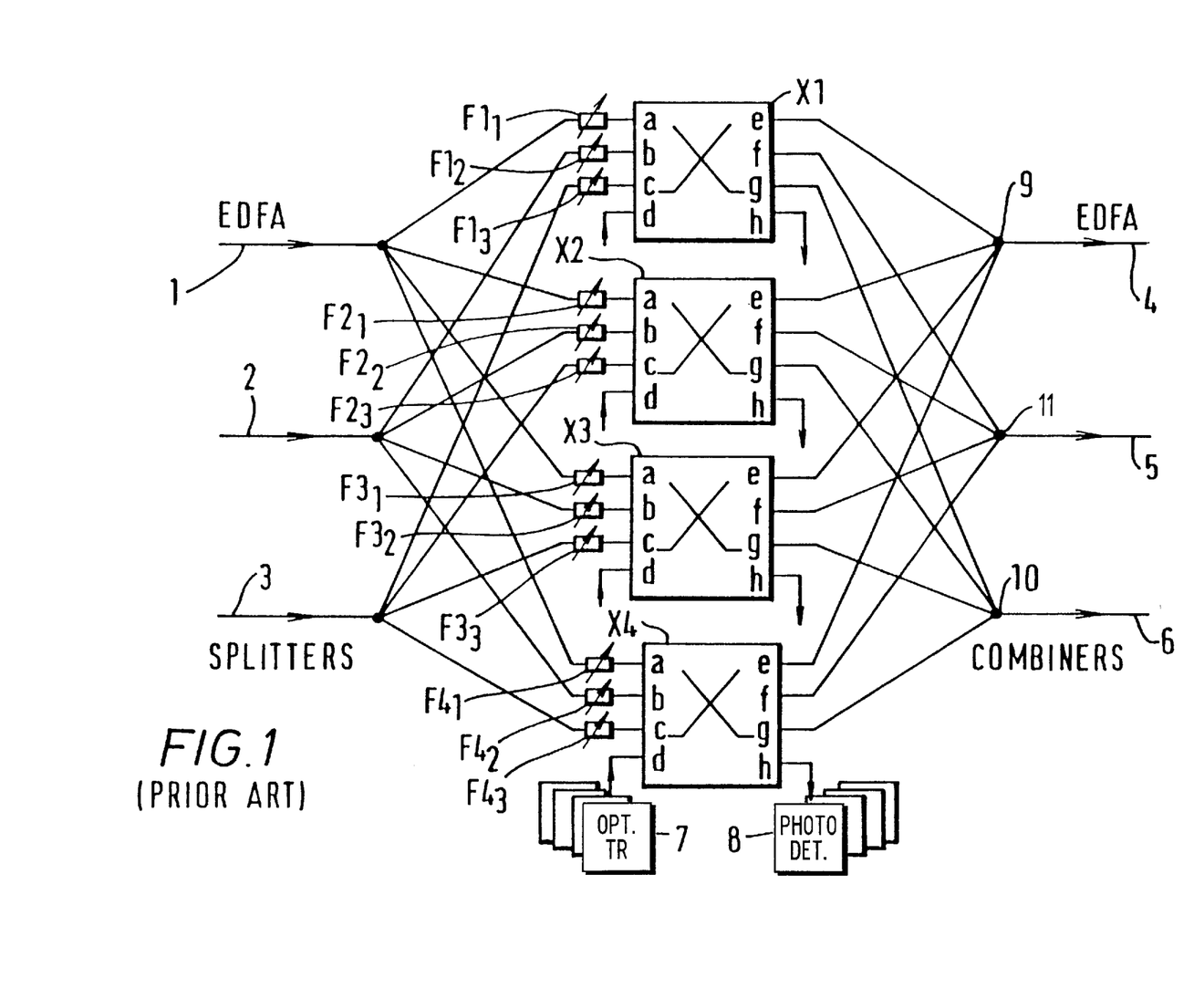
FIG. 1 is a schematic block diagram of a prior OXC, described hereinbefore.

A number of prior proposals have been made for the node architecture of the OXC and an example is given in FIG. 1.

Three input fibres 1, 2, 3 are connected at the node to output fibres 4, 5, 6. Each of the fibres 1–3 carries four WDM wavelength channels, which are connected to the output fibres 4–6 by means of space switches $X_1$–$X_4$. In this example, the space switches are 4×4 matrices which thus have four inputs a–d and four outputs e–h that are optically interconnectable and are controlled by applied electrical signals (not shown). Such space switches are well known and include electrically controllable elements of variable refractive index to produce selective switching between the inputs and outputs.

The four optical channels of each input fibre 1–3 are applied to an input of each of the space switches $X_1$–$X_4$ and each is separately selected by means of a respective tunable filter $F1_1$, $F2_1$, $F3_1$, $F4_1$. Similarly, the various wavelength channels from fibres 2 and 3 are applied to respective inputs of the space switches through filters $F1_2$–$F4_2$, $F1_3$–$F4_3$. The fourth input of each space switch $X_1$–$X_4$ is connected to tunable optical transmitter units 7 which produce optical signals of a single frequency in response to digital electrical signal streams from the lower electrical layer of the network, to allow electrical signals to be added into the optical network for transmission in the optical layer. The electrical signals may be SDH, PDH, ATM, X25 or any other suitable format, since the optical network can transmit the bit stream transparently in the optical domain. Similarly the outputs h of each of the space switches $X_1$–$X_4$ are connected to receiver units 8 that include photodetectors for producing electrical signals, so that digital data streams can be dropped out of the optical network into the lower, electrical layer. The outputs e–g of the space switches $X_1$–$X_4$ are respectively connected to the inputs to the fibres 4, 5 and 6 by means of combiners 9, 10, 11. Thus, by applying control signals to the space switches $X_1$–$X_4$ traffic in the WDM channels of input fibres 1–3 can be switched selectively between output fibres 4–6 and signal trains can be added to and dropped out of the optical network by means of the transmitters and receivers 7, 8. This arrangement however suffers from a number of disadvantages.

Firstly, the ultimate size of the OXC is limited by the size of the space switches. Currently, these are made in $LiNbO_3$ or InP and are limited for practical purposes to 8×8. Also, for polarisation independent operation they typically require high switching voltages of the order of +/−100 V and have long rise times >100 ns. Furthermore, the devices are not at present hermetically sealed, and the material thereof tends to exhibit drift characteristics, so as to alter the performance with time.

Secondly, a node configuration as shown in FIG. 1 produces a loss of approximately 30 dB and the main contributor to the loss is the switch array. In order to overcome this problem, optical fibre amplifiers such as erbium doped fibre amplifiers need to be used to provide amplification.

Thirdly, the node architecture exhibits blocking characteristics. It is not possible for the same wavelength channel from two of the input fibres to leave on the same output fibre.

SUMMARY OF THE INVENTION

The invention provides an improved cross-connect, suitable for an optical network, which may overcome at least some of these problems. In accordance with the invention there is provided an optical cross-connect comprising: a plurality of input means each for receiving a respective group of input signals and deriving in response to each signal of the group an individual optical signal of a respective given wavelength, a plurality of output means each including a plurality of receptors selectively responsive to respective ones of the wavelengths of said optical signals to provide an output signal for the output means, and a plurality of coupling means each for coupling a respective one of said optical signals, each of a different wavelength, from each of the input means, to a respective receptor of each of the output means.

In accordance with the invention, it is possible to route signals of the same wavelength from different input means co a particular one of the output means. Furthermore, the losses involved may be substantially reduced.

In one form, the plurality of coupling means comprises a plurality of star couplers, and in another form comprises a plurality of optical bus lines to which the input and output means may be selectively added and removed as modules.

The input signals may be electrical or optical and the plurality of input means may be configured to process optical and electrical signals, to allow electrical signals to be added into the optical signal traffic. Similarly, at least one of the output means may produce electrical output signals to allow optical signals to be dropped to an electrical network.

Furthermore, an improved non-blocking arrangement may be provided, in which a plurality of the input means are each operative to receive a respective group (k) of input signals and derive in response to each signal of the group an individual optical signal of a respective given wavelength, the individual output signals being provided on selected ones of a plurality of output channels greater than k, a plurality of the output means each including a plurality of receptors greater in number than k, are selectively responsive to respective ones of the wavelengths of said optical signals to provide an output signal for the output means, and a plurality of the coupling means greater in number than k, are each operative to couple a respective one of said optical signals, each of a different wavelength, from each of the input means, to a respective receptor of each of the output means.

BRIEF DESCRIPTION OF THE DRAWINGS

In order that the invention may be more fully understood an embodiment thereof will now be described by way of example, reference being had to the accompanying drawings in which.

DETAILED DESCRIPTION

Figure 2:
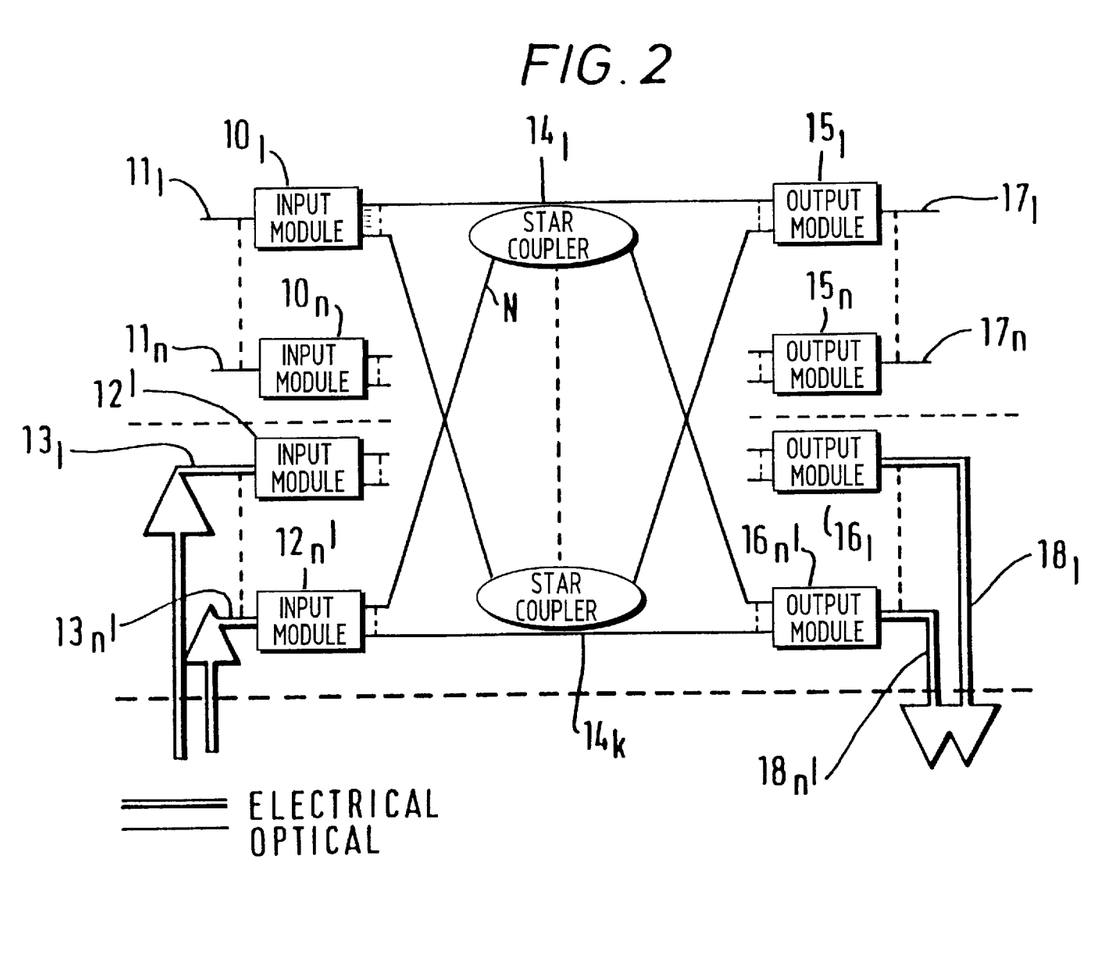
FIG. 2 is a schematic block diagram of an optical cross-connect in accordance with the invention.

Referring to FIG. 2, the OXC in accordance with the invention is configured for use at a node in a WDM hierarchical telecommunication system that includes an optical layer overlying various electronic layers.

The OXC includes a number of input means in the form of input modules $10_1$–$10_n$ to which optical fibres $11_1$–$11_n$ are connected, the optical fibres carrying k channel WDX signals. The OXC also receives inputs from the electronic layer that are applied to input modules $12_1$–$12_n$'. Each input module 12 receives k electrical lines 13 carrying electrical input digital signals.

As will be explained in more detail hereinafter, signals corresponding to the k channels of each electrical and optical input, are connected by means of k star couplers $14_1$–$14_k$ to a plurality of output means in the form of optical output modules $15_1$–$15_n$ and electronic output modules $16_1$–$16_n$'. The output modules $15_1$–$15_n$ provide k channel WDM optical signals on output fibres $17_1$–$17_n$. The output modules 16 provide electrical outputs that can be dropped down to the electronic layer of the network on lines $18_{1-18n'}$.

Figure 3A:
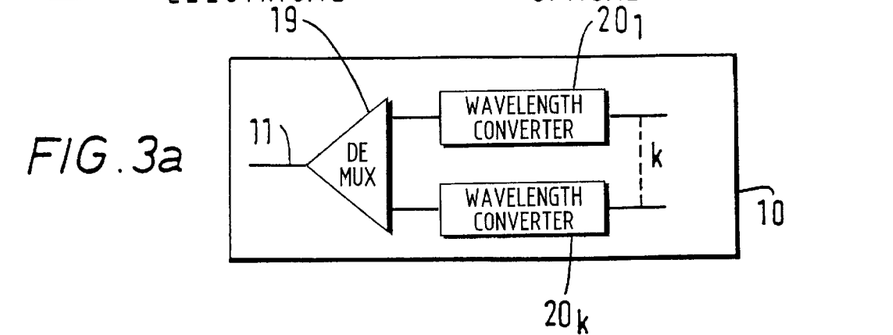
FIG. 3 illustrates schematically input and output modules of the cross-connect shown in FIG. 2.

The structure of a first example of input module 10 is shown in FIG. 3A and consists of a demultiplexer 19 which demultiplexes k channel WDM signals on input fibre 11 onto k parallel channels, each of which includes a wavelength converter $20_1$–$20_k$. The wavelength converters each produce a respective different wavelength in response to the input signal applied thereto so that the device shown in FIG. 3A provides one of N different output wavelengths to be coupled to the star couplers 14 as will be described hereinafter, where N corresponds to the total number of input or output modules (n+n'). The wavelength converters may comprise all-optical devices or may include an opto-electrical detector that drives a tunable laser. Examples of specific wavelength converters currently available are listed in "Photonic terabit/s networks and their key components" H. R. van As, IBM Research Div (Rüschlikon) 11$^{th}$ Annual Conference on European Fibre Optic Communications and Networks (EFOC & N '93) Jun. 30–July 1993 pp 13–20, and in particular on page 18.

Figure 3B:
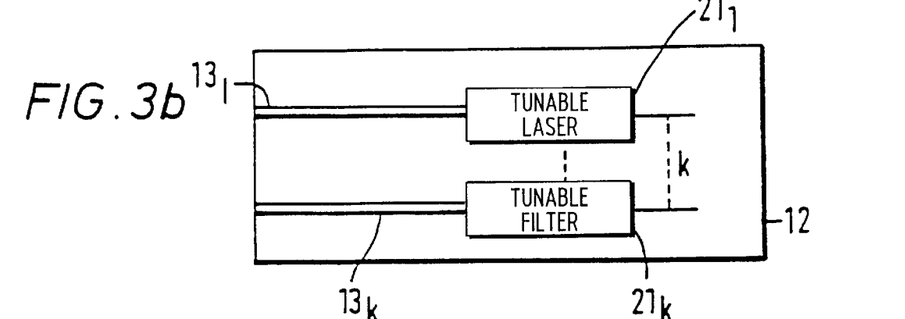

The structure of each input module 12 for electrical signals is shown in more detail in FIG. 3B. Each input module 12 receives k parallel electrical lines $13_1$–$13_k$ that are connected to respective lasers $21_1$–$21_k$ that are tunable over the N different output wavelengths. Thus the lasers, which are typically laser diodes, produce output modulated signals at k different wavelengths, for the k input electrical signal channels. Specific examples of commercially available tunable lasers suitable for the system are listed on page 17 of the EFOC & N '93 paper, supra.

Referring to FIG. 2, the star couplers $14_1$–$14_k$ each include N optical inputs and N optical outputs. The N inputs of each star coupler 14 are connected to receive individual different frequency outputs from each of the input modules. Thus, referring to FIG. 2, star coupler $14_1$ has inputs connected to receive a respective different wavelength signal train from each of the input modules $10_1$–$10_n$ and $12_1$–$12_n$'. In order to simplify the drawing, only the connections from input module $10_1$ and $12_n$' are shown. Similarly, for the star coupler $14_k$, connections from input module $10_1$ and $12_n$' are shown with the other connections being omitted to simplify the drawing. The connections to star couplers $14_2$–$14_{k-1}$ have also been omitted for simplicity. For each of the star couplers 14, the inputs are so arranged that each receives an individual wavelength from the groups of different wavelengths produced by each of the input modules 10 and 12.

Each star coupler 14 operates in a manner well known per se so as to mix all the input signal trains and feed them to all of its outputs. Thus, considering for example star coupler $14_1$, a mixture of all of its inputs is applied to N outputs, namely to each of the output modules $15_1$–$15_n$, $16_1$–$16_n$'.

Figure 3C:
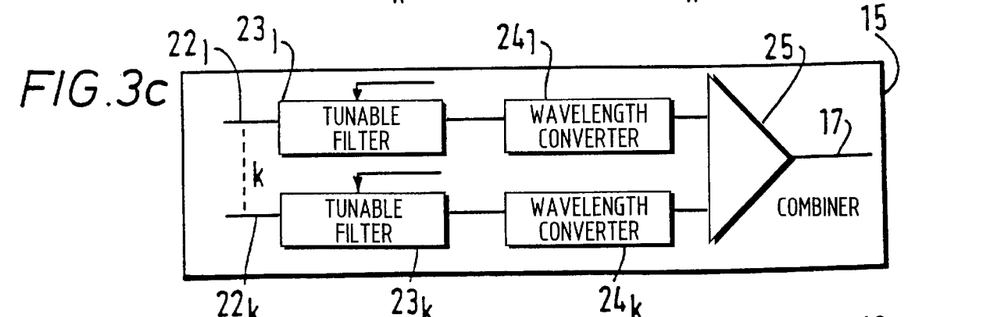

The nature of each of the output modules will now be described with reference to FIG. 3. Referring to FIG. 3C, the structure of each optical output module 15 is shown. The module consists of k inputs $22_1$–$22_k$ which are individually connected to one output of each of the star couplers $14_1$–$14_k$. Each input 22 is connected to a receptor in the form of a tunable filter $23_1$–$23_k$ which is individually tunable in order to select individual wavelengths from the mixture of signals applied to each input 22. Commercially available tunable filters are described in detail on page 17 of the EFOC & N '93 paper, supra, and may comprise electro-mechanically tuned filters (e.g. Fabry-Perot etalon), acousto-optical or semiconductor filters.

It will be recalled that each star coupler, connected to a corresponding one of the inputs 22, supplies a mixture of signals of different wavelengths selected from one of the outputs of each of the input modules 10, 12. Thus, each tunable filter $23_1$–$23_k$ can be used to select an individual signal from one of the input modules on the basis of a wavelength selection. The tunable filters may be tuned individually by the application of an external control voltage from a control system (not shown). The output of each filter $23_1$–$23_k$ is applied to a corresponding wavelength converter $24_1$–$24_k$. The wavelength converters produce signals that are combined by means of a passive combiner 25 to produce a k channel WDM signal on output fibre 17.

Thus, by suitable selection of the pass frequencies of the filters 23, selection of individual signals can be achieved for each output fibre 17 so that a selective cross-connection can be achieved between the input fibres 11 and output fibres 17. Moreover, electrical signals applied to input modules 12 can be added into the k channel WDM signals produced at output fibres 17, thus lifting the electrical signal from the electronic layer of the network to the optical layer.

Figure 3D:
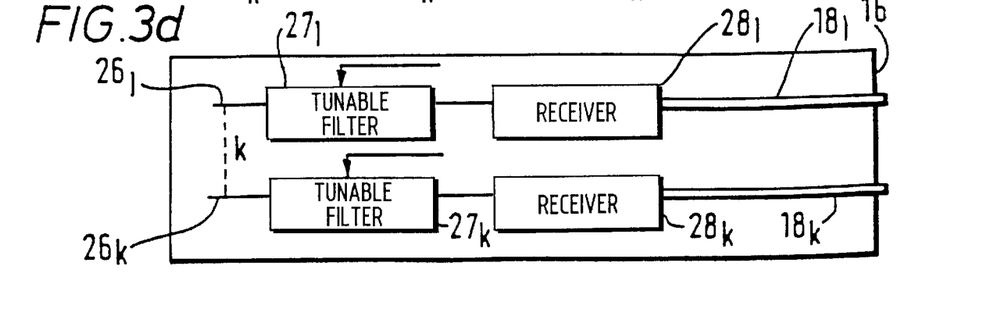

FIG. 3D shows a structure for each electrical module 16, which allows optical signal trains to drop down from the optical layer to the electrical layer of the network. Each output module 16 consists of k input lines $26_1$–$26_k$ which are applied to tunable filters $27_1$–$27_k$ that function in a similar manner to the tunable filters 23 so as to select individual signal wavelengths. The outputs of the tunable filters 27 are applied to corresponding receivers $28_1$–$28_k$, typically in the form of photodiodes, which produce electrical signals corresponding to the signals of selected wavelength. The resulting k digital signal trains are applied to k output lines, which make up each output 18. Thus, signals of particular wavelengths are selected by the tunable filters 27 and are dropped down to electrical signals for use in the electronic layer of the network.

A problem with the configuration described so far is that signal blocking can occur at some of the outputs 17. This can be understood from FIG. 4 which is an enlarged, partial illustration of the configuration of FIG. 2, FIG. 3A and FIG. 3B, showing input modules $10_1$, $10_2$, star coupler $14_1$ and output module $15_1$, the other components having been omitted to simplify the drawing.

Figure 4:
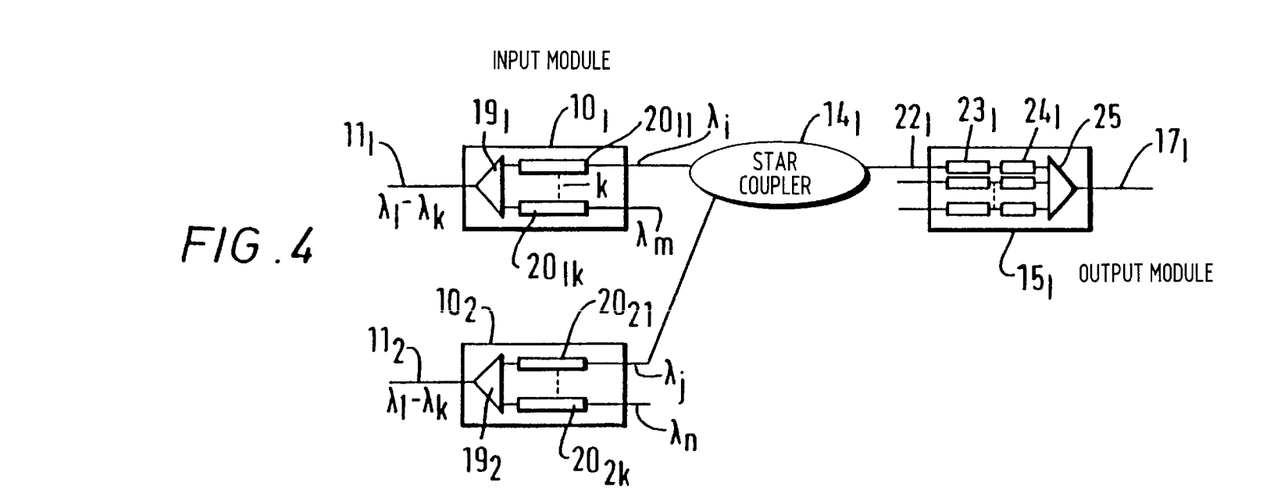
FIG. 4 illustrates signal blocking in the arrangement of FIGS. 2 and 3.

Referring to input module $10_1$, the input WDM signal is demultiplexed by demultiplexer $19_1$ to provide k signals of wavelength $\lambda_1$–$\lambda_k$ which are applied to respective wavelength converters $20_{1f}$–$20_{1k}$. The wavelength converters produce respective outputs $\lambda_i$–$\lambda_m$.

A similar set of signals is produced by input module $10_2$, comprising wavelengths $\lambda_j$,$\lambda_n$ as shown in FIG. 4. Each of the other input modules (not shown) produce similar outputs. Considering now the star coupler $14_1$, each of its N inputs receives a signal from the first wavelength converter $20_{11}$–$20_{21}$, etc. and the arrangement is set up so that each of the input wavelengths is different. Thus N separate wavelengths are applied to the star coupler. Accordingly, referring to FIG. 4, $\lambda_i \neq \lambda_j$. As previously explained, the resulting mix of signals produced by star coupler $14_1$ is applied to a single input of each of the output modules $15_1$–$15_n$, $16_1$–$16_n$. Thus, considering the output module $15_1$ as shown in FIG. 4, it is not possible to select wavelength $\lambda_i$ and $\lambda_j$ from the input modules $10_1$, $10_2$ simultaneously at the output module $15_1$ since both of the signals are applied simultaneously to one of the filters 23. In FIG. 4 this is shown as input filter $23_1$. The filter $23_1$ can select only one of the wavelengths $\lambda_i$, $\lambda_j$ and therefore, signal blocking of one of the wavelengths will occur.

Figure 5:
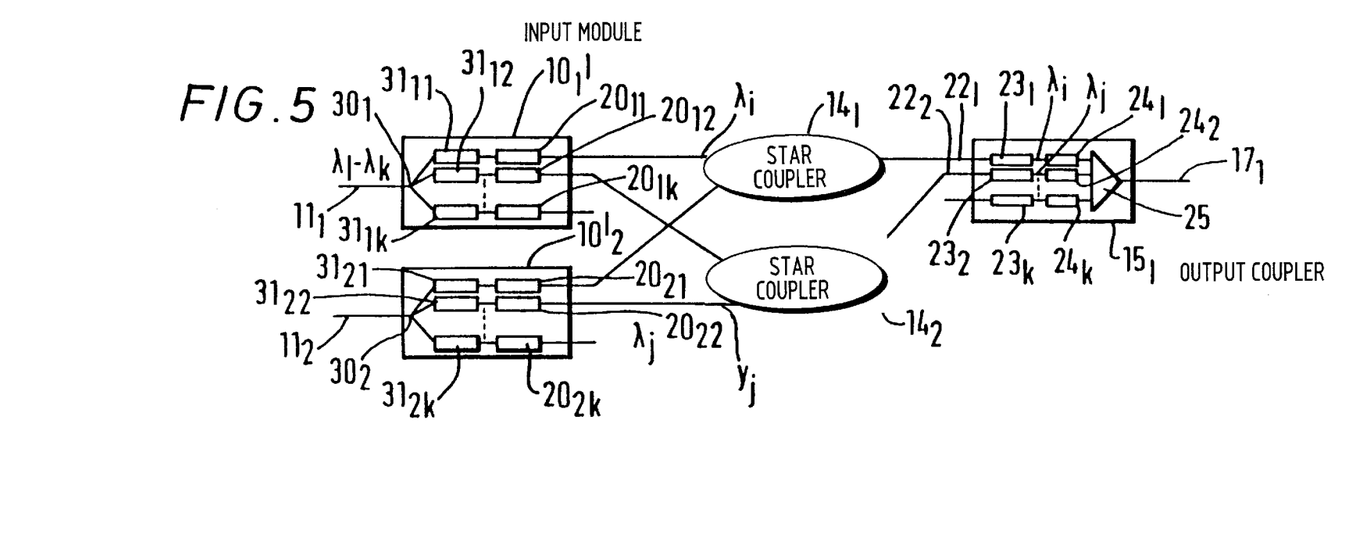
FIG. 5 is a schematic block diagram of the cross-connect with an alternative form of input module which avoids signal blocking.

This problem is overcome by the configuration shown in FIG. 5, in which a different form of the input module 10' is provided. Referring to input module $10'_1$ the input WDM signals applied on input fibre $11_1$ are fed to a beam splitter $30_1$ that provides k parallel channel outputs each of which is fed to a tunable filter $31_{1f}$–$31_{1k}$ that in turn are connected to individual wavelength converters $20_{1f}$–$20_{1k}$. Thus, by tuning the individual filters $31_{1f}$–$31_{1k}$, the different input signals $\lambda_1$–$\lambda_k$ can be applied to different ones of the k channels selectively. The wavelength converters $20_{1f}$–$20_{1k}$ then produce appropriate signals for the inputs of the star couplers 14. In FIG. 5, the first two star couplers $14_1$, $14_2$ are shown. When it is desired to assemble a signal at output module $15_1$ that contains wavelength $\lambda_i$ from input module $10'_1$ and $\lambda_j$ from input module $10'_2$, if, as previously described with reference to FIG. 4, these signals were applied to the inputs of a single one of the star couplers, blocking would occur. However, as shown in FIG. 5, the tunable filter $31_{22}$ is adjusted such that wavelength converter $20_{22}$ (rather than converter $20_{21}$) produces the output wavelength $\lambda_j$. Consequently, the signal of wavelength $\lambda_j$ is applied to star couplers $14_2$ and hence to the second input of the output module $15_1$. Thus, the signals of wavelength $\lambda_i$ and $\lambda_j$ can be selected by the tunable filters $23_1$ and $23_2$ respectively in the output module $15_1$. In this way, signal blocking is avoided.

Figure 6:
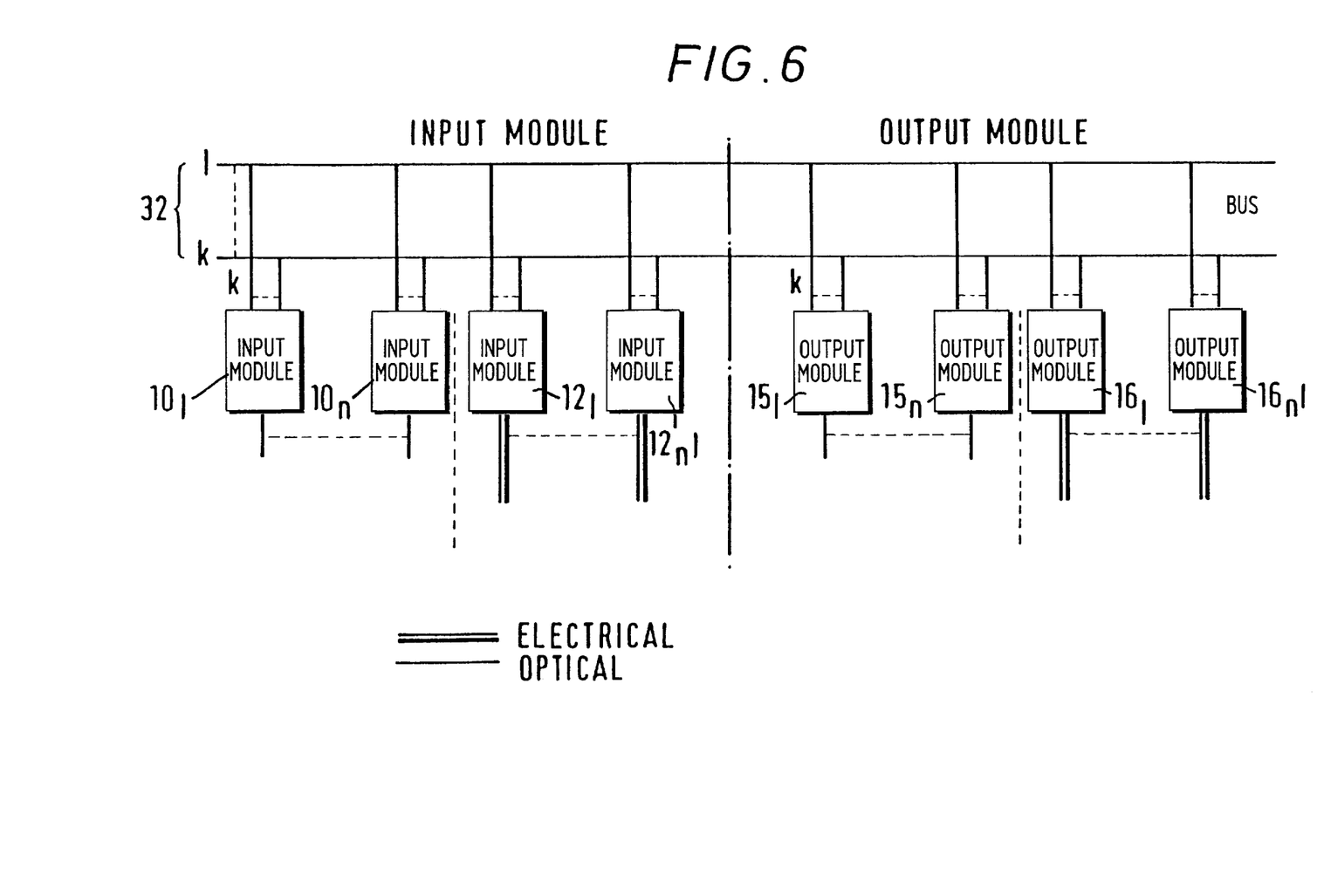
FIG. 6 is a schematic block diagram of an alternative form of cross-connect in accordance with the invention, which utilises a back plane bus.

Referring to FIG. 6, this shows an alternative configuration in which the star couplers of FIG. 2 are replaced by a back plane bus. Thus, the individual input modules $10_1$–$10_n$, $12_1$–$12_n$ have their k outputs connected individually to k parallel optical fibres 32 which form a fibre back plane. The output modules $15_1$–$15_n$ and $16_1$–$16_n$ have their respective k inputs selectively connected to the k fibres of the back plane. This arrangement is particularly suited to use with input modules of the form shown in FIG. 5 since individual signal trains can be programmably applied to individual ones of the back plane fibres 32 and then selectively received by the output modules 15, 16 under the control of tunable filters 23, 27. This arrangement has the advantage that the individual modules can be arranged as units that can be plugged onto the back plane for example by using optical D-couplers.

The described examples of the invention have the advantage that the number of elements that need to be controlled is much smaller as compared with the configuration shown in FIG. 1. Considering an example of the OXC of FIG. 2, when compared with that of FIG. 1, when the number of wavelengths k=4 and the number of input and output optical lines is 3, the component count is set out in the following table:

TABLE

|  | FIG. 1 | FIG. 2 |
| --- | --- | --- |
| Number of tunable filters | 12 | 16 |
| Number of tunable sources | 4 | 4 |
| Number of crosspoints | 112 | — |
| Number of wavelength converters | — | 24 |
| Total | 128 | 44 |

Furthermore, since the wavelength converters in the input modules can be permanently set such that the output wavelength of a converter is always the same, the number of elements requiring control can be reduced to 36.

The optical star couplers of FIG. 2 and the back plane bus of FIG. 6 are inexpensive components as compared with the space switches shown in FIG. 1. Packaged optical star couplers which are wavelength insensitive between 1300–1600 nm and as large as 144×144 have been reported and are thus suited to implement the invention. Since the optical star couplers are themselves inexpensive compared to the input and output modules shown in FIG. 2, it is envisaged that not all the input and output modules need be attached at the time of commissioning the system so that the system can readily be upgraded in terms of its capacity thereafter. The described input and output modules both include wavelength converters, with the advantage that if a signal inversion occurs at the wavelength converter, two inversions occur, so that no signal inversion will occur in the final output of the cross-connect.

Figure 7:
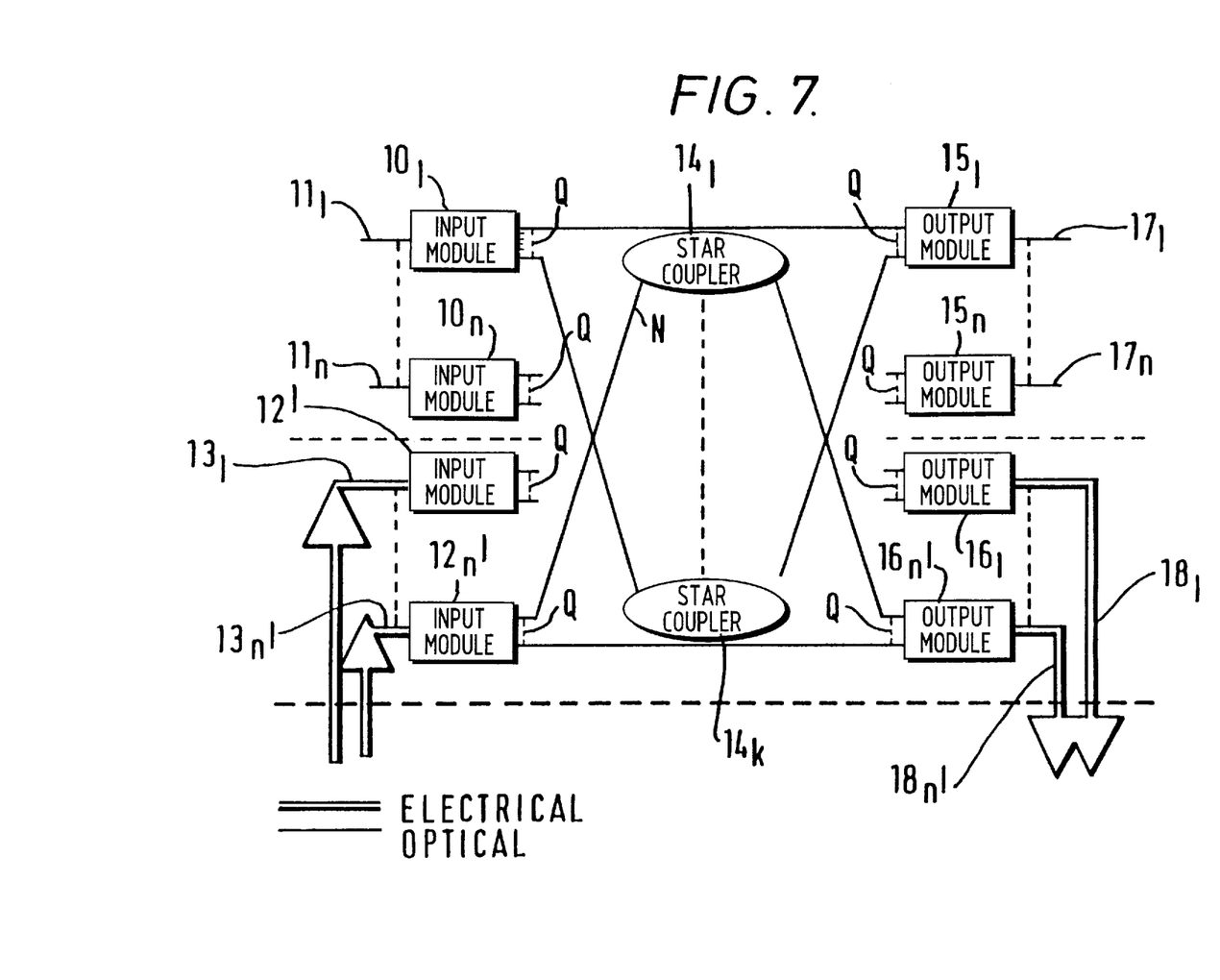
FIG. 7 illustrates a further optical cross-connect in accordance with the invention.

An embodiment of the invention will now be described in A which an alternative way of avoiding channel blocking is achieved. Referring to FIG. 7, the structure is generally similar to that shown in FIG. 2 and like parts are given the same reference numbers. Each of the input optical fibres 11 carries k optical multiplex channels, but each input module 10, instead of providing k parallel channels, provides Q channels where:

$$Q > 2k-1 \quad (1)$$

Similarly, the input modules 12 provide Q parallel channels and Q star couplers 14 are provided. Each of the output modules 15, 16 is provided with Q parallel channels.

Figure 8A:
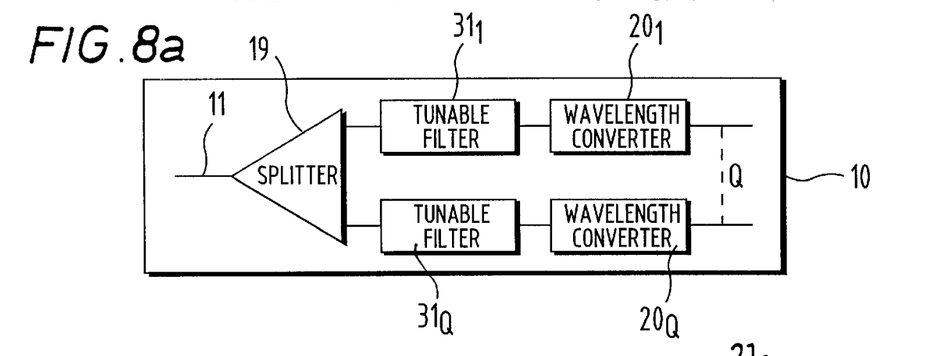
FIG. 8 illustrates schematically input and output modules of the cross-connect shown in FIG. 7.

The various input and output modules 10, 12, 15 and 16 are shown in more detail in FIGS. 8a–d respectively. Referring to FIG. 8a, each input module 10 is similar to that shown in FIG. 5 but with Q channels, and consists of an input fibre 11 that carries k input multiplexed channels, connected to a passive splitter 19 that has Q outputs coupled to Q tunable filters $31_1$–$31_Q$ which are respectively connected to wavelength converters $20_1$–$20_Q$, in order to provide Q parallel outputs. From the foregoing, it will be seen that the channel redundancy of (Q–k) and the tunable nature of the various channels Q allows a strictly non-blocking configuration to be provided.

Figure 8B:
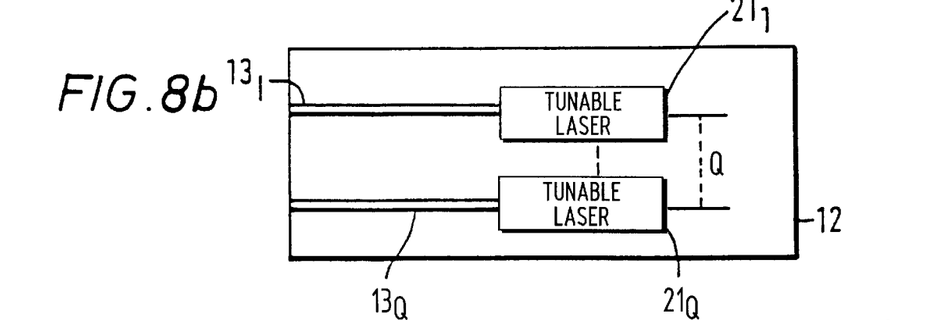
Figure 8C:
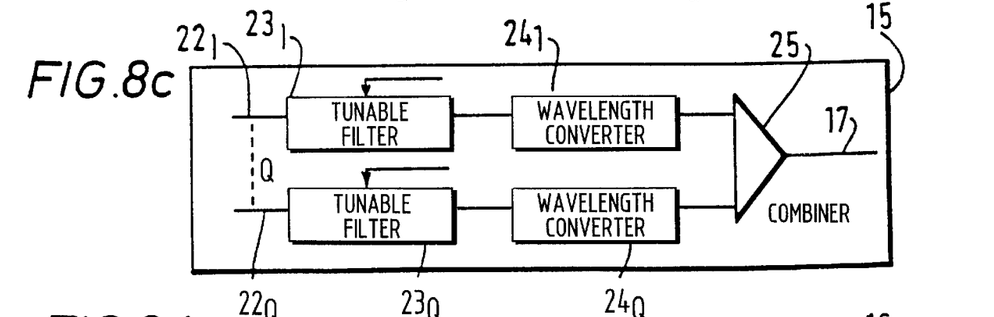
Figure 8D:
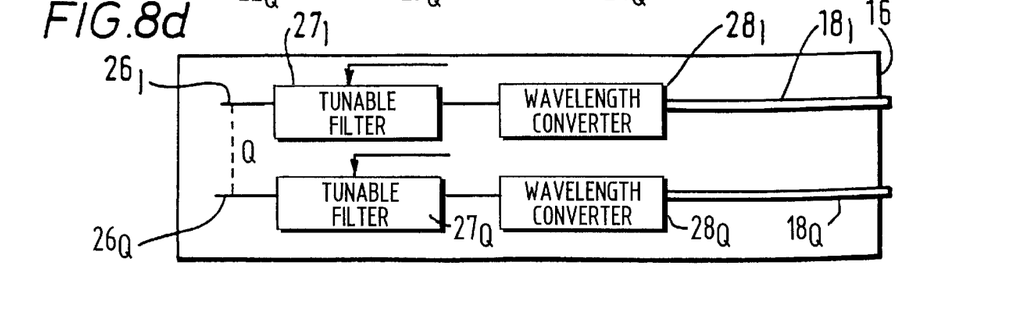

Referring now to FIG. 8b which shows the input module 12, the arrangement has Q input channels connected to respective tunable lasers $21_1$–$21_Q$. For a system which provides k input channels, the remaining input channels (Q–k) can be used to provide test signals. The configuration of the output modules 15, 16 shown in FIGS. 8c, d is the same as that shown in FIGS. 3c, d except for the provision of Q parallel channels rather than k. It will be seen that by appropriate selection of the wavelength of operation of tunable filters 31 and 23, 27, a fully non-blocking architecture is provided by virtue of the (Q–k) channel redundancy. Whilst this non-blocking arrangement has been described for use with the star couplers 14, it will be appreciated that it can also be used in connection with a back plane bus as shown in FIG. 6, but utilising Q back plane channels. Thus the various modules of FIG. 8, could be used with a Q channel back plane bus.

Since the wavelengths used in the cross-connect according to the invention are selected independently of the wavelengths used in the optical network itself, it is not necessary to control the preciseness of wavelength throughout the entire network but only on a link-by-link basis, since each optical cross-connect in accordance with the invention provides a decoupling between adjacent sections of the network.

Also, the separation of the N wavelengths used in the optical cross-connect need not be the same as the separation of the wavelengths $\lambda_1$–$\lambda_k$ used on the link. For example, the link wavelengths $\lambda_1$–$\lambda_k$ may each be separated by 2 nm whereas the wavelengths $\lambda_i$, $\lambda_n$ can be separated by 1 nm, 2 nm, 3 nm or any other suitable spacing.

Thus, the set of wavelengths used in the optical cross-connect is independent of the network and the number of trunk lines and the number of channels k used in the network itself. Thus, N can be chosen independently of k.

I claim:

1. An optical cross-connect comprising:
    a plurality of input modules each configured to receive a respective group of input signals and derive in response to each signal of the group an individual optical signal ($\lambda_1$) of a respective given wavelength,
    a plurality of output modules each including a plurality of receptors selectively responsive to respective ones of the wavelengths of said optical signals to provide an output signal for the output module, and
    a plurality of couplers each configured to couple a respective one of said optical signals, each of a different wavelength, from each of the input modules, to a receptor of each of the output modules, wherein said input modules and said output modules are selectively connectible to said couplers.

2. An optical cross-connect according to claim 1 wherein said input signals comprise multiplexed optical signals and at least some of said input modules include elements responsive to the multiplexed optical signals to produce said individual optical signals of respective given wavelengths.

3. An optical cross-connect according to claim 2 wherein said multiplexed optical signals comprise WDM signals.

4. An optical cross-connect according to claim 3 wherein the input modules comprise a WDM demultiplexer for demultiplexing the input WDM signals, and a plurality of wavelength converters responsive respectively to the demultiplexed signals for producing said individual optical signals.

5. An optical cross-connect according to claim 3 wherein said input modules include selection elements for determining which one of said individual optical signals from the respective input modules is to be coupled to a particular one of the couplers.

6. An optical cross-connect according to claim 5 wherein at least some of said selection elements include a beam splitter for splitting the WDM optical signals into a plurality of paths, and tunable filters associated with the paths for producing an individual optical signal on each path.

7. An optical cross-connect according to claim 6 including wavelength converters connected to the outputs of the tunable filters respectively.

8. An optical cross-connect according to claim 2 wherein at least some of the output modules include a respective combiner for combining the outputs of the receptors to provide the output signal.

9. An optical cross-connect according to claim 8 including wavelength converters connected to the outputs of the receptors.

10. An optical cross-connect according to claim 1 wherein at least one group of said input signals comprise electrical signals and the input module that receives the electrical signals includes a plurality of tunable lasers operative to generate corresponding optical signals at said different wavelengths.

11. An optical cross-connect according to claim 1 wherein at least one of the output modules includes photodetectors connected to the receptors thereof for producing a plurality of output electrical signals.

12. An optical cross-connect according to claim 1 wherein the receptors comprise tunable filters.

13. An optical cross-connect according to claim 1 wherein said plurality of couplers comprise a plurality of star couplers.

14. An optical cross-connect according to claim 1 wherein said plurality of couplers comprise a plurality of bus lines, with the optical signals of different wavelengths from each input module being coupled to the bus lines, and the receptors of each output module being coupled to the bus lines.

15. An optical cross-connect according to claim 14 wherein said input and said output modules are selectively addable to and removable from connection with the bus lines.

16. An optical cross-connect according to claim 1 wherein the wavelengths of the individual optical signals are selectable independently of the wavelengths of the input signals.

17. An optical cross-connect comprising:
a plurality of input modules each configured to receive a respective group of input signals and derive in response to each signal of the group an individual optical signal ($\lambda_1$) of a respective given wavelength,
a plurality of output modules each including a plurality of receptors selectively responsive to respective ones of the wavelengths of said optical signals to provide an output signal for the output module, and
a plurality of couplers each configured to couple a respective one of said optical signals, each of a different wavelength, from each of the input modules, to a receptor of each of the output modules, wherein said input modules and said output modules are selectively connectable to said couplers;
wherein a plurality of the input modules are each operative to receive a respective group (k) of input signals and derive in response to each signal of the group an individual optical signal of a respective given wavelength, the individual output signals being provided on selected ones of a plurality of output channels greater than k, a plurality of the output modules each including a plurality of receptors greater in number than k, are selectively responsive to respective ones of the wavelengths of said optical signals to provide an output signal for the output module and a plurality of the couplers greater in number than k, are each operative to couple a respective one of said optical signals, each of a different wavelength, from each of the input modules, to a respective receptor of each of the output modules.

18. An optical cross-connect according to claim 17 wherein the input modules each include Q channels where Q>2k−1.

19. An optical cross-connect according to claim 18 including Q of said couplers.

20. An optical cross-connect according to claim 17 including Q of said receptors for each of said output modules.

21. An optical cross-connect comprising:
a plurality of parallel star couplers, each star coupler comprising a plurality of inputs and a plurality of outputs, said inputs being configured to receive a plurality of optical input signals, each at a different wavelength, and to produce at each of said plurality of outputs of each star coupler a composite signal comprising all of the optical input signals input to that star coupler;
a plurality of output modules, each output module comprising a plurality of receptors;
an output from each of the plurality of parallel star couplers being coupled to each of said output modules, said receptors being selectively responsive to respective ones of the wavelengths of said optical signals.

22. An optical cross-connect according to claim 21, wherein each star coupler includes at least one unused input, so as to produce an expandable optical cross-connect.

23. An optical cross-connect according to claim 21, wherein each star coupler includes at least one unused output, so as to produce an expandable optical cross-connect.

24. An optical cross-connect comprising:
a plurality of bus lines, each bus line being configured to receive a plurality of optical input signals, each at a different wavelength, so as to produce at each bus line a composite signal comprising all of the optical input signals input to that bus line;
a plurality of output modules, each output module comprising a plurality of receptors;
each bus line being coupled to each of said output modules and said receptors being selectively responsive to respective ones of the wavelengths of said optical signals.

25. A method of expanding an optical cross-connect, the optical cross-connect comprising:
a plurality of input modules each configured to receive a respective group of input signals and derive in response to each signal of the group an individual optical signal ($\lambda_i$) of a respective given wavelength;
a plurality of couplers comprising a plurality of inputs and a plurality of outputs, said input modules being connected to the inputs of said plurality of couplers;
a plurality of output modules each including a plurality of receptors selectively responsive to respective ones of the wavelengths of said optical signals to provide an output signal for each output module, said output modules being connected to the outputs of said plurality of couplers; and
at least one additional input module comprising a plurality of outputs;
wherein the plurality of couplers are each operable to couple a respective one of said optical signals, each of a different wavelength, from each of the input modules, to a receptor of each of the output modules, and each coupler includes a number of inputs greater than the number of input modules such that a number of said inputs are unconnected; the method comprising:
connecting each of said outputs of said at least one additional input module to an unconnected input on each of the couplers.

26. A method of expanding an optical cross-connect, the optical cross-connect comprising:
a plurality of input modules each configured to receive a respective group of input signals and derive in response to each signal of the group an individual optical signal ($\lambda_i$) of a respective given wavelength;
a plurality of couplers comprising a plurality of inputs and a plurality of outputs, said input modules being connected to the inputs of said plurality of couplers;
a plurality of output modules each including a plurality of receptors selectively responsive to respective ones of the wavelengths of said optical signals to provide an output signal for each output module, said output modules being connected to the outputs of said plurality of couplers; and
at least one additional output module comprising a plurality of inputs;
wherein the plurality of couplers are each operable to couple a respective one of said optical signals, each of a different wavelength, from each of the input modules, to a receptor of each of the output modules, and each coupler includes a number of outputs greater than the number of output modules such that a number of said outputs are unconnected; the method comprising:

connecting an unconnected output on each of the couplers to each of said inputs of said at least one additional output module.

27. In an optical cross-connect comprising:

a plurality of input modules each configured to receive a respective group of input signals and derive in response to each signal of the group an individual optical signal ($\lambda_i$) of a respective given wavelength, a plurality of output modules each including a plurality of receptors selectively responsive to respective ones of the wavelengths of said optical signals to provide an output signal for the output module, and a plurality of couplers each configured to couple a respective one of said optical signals, each of a different wavelength, from each of the input modules, to a receptor of each of the output modules, wherein said input modules and said output modules are selectively connectible to said couplers;

the improvement comprising each of said couplers having at least one unconnected input, whereby an additional input module is connectible to said couplers so as to expand the cross-connect without increasing the number of couplers.

28. In an optical cross-connect comprising:

a plurality of input modules each configured to receive a respective group of input signals and derive in response to each signal of the group an individual optical signal ($\lambda_i$ of a respective given wavelength, a plurality of output modules each including a plurality of receptors selectively responsive to respective ones of the wavelengths of said optical signals to provide an output signal for the output module, and a plurality of couplers each configured to couple a respective one of said optical signals, each of a different wavelength, from each of the input modules, to a receptor of each of the output modules, wherein said input modules and said output modules are selectively connectible to said couplers;

the improvement comprising each of said couplers having at least one unconnected output, whereby an additional output module is connectible to said couplers so as to expand the cross-connect without increasing the number of couplers.

* * * * *